No. 774,008. PATENTED NOV. 1, 1904.
W. M. WADE.
AUTOMATIC WEIGHING TRUCK.
APPLICATION FILED AUG. 17, 1903.
NO MODEL. 2 SHEETS—SHEET 1.
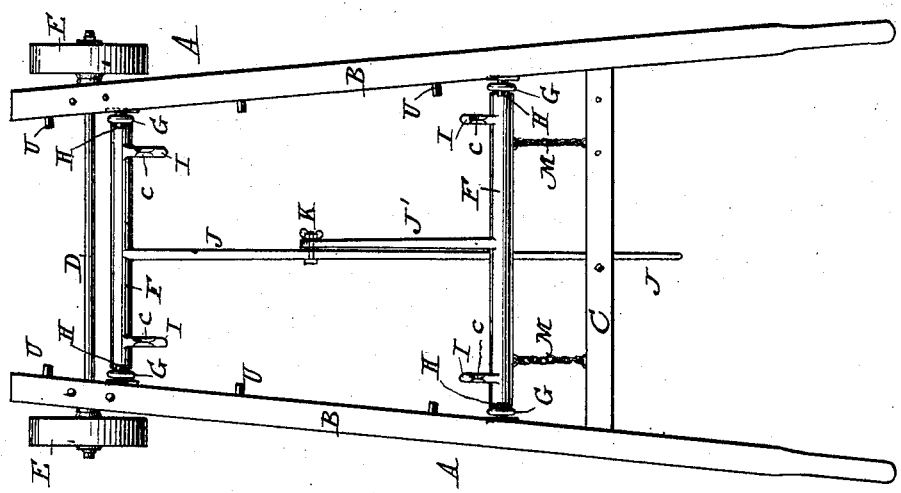
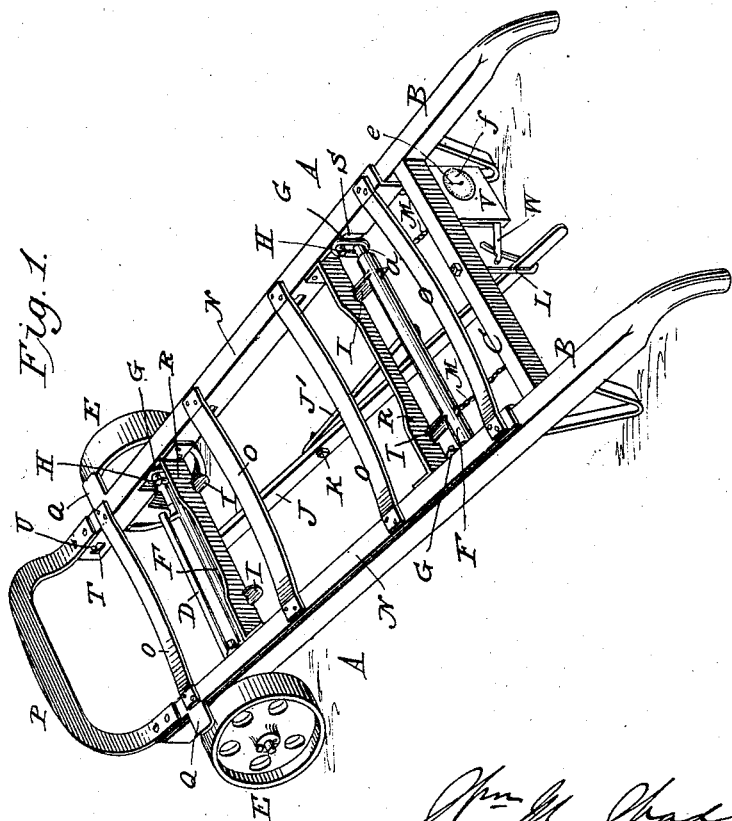

No. 774,008. PATENTED NOV. 1, 1904.
W. M. WADE.
AUTOMATIC WEIGHING TRUCK.
APPLICATION FILED AUG. 17, 1903.
NO MODEL. 2 SHEETS—SHEET 2.
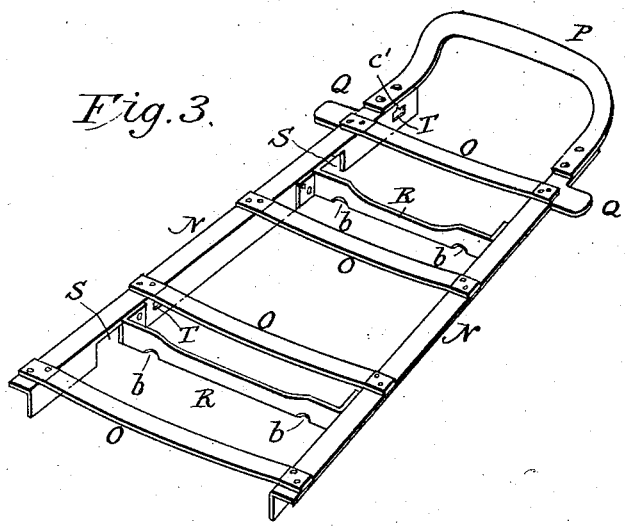
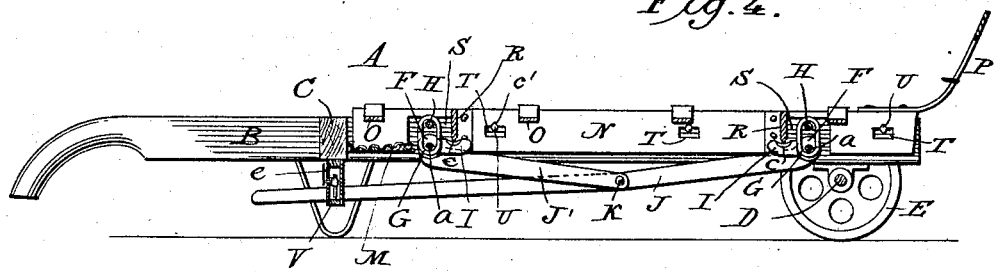
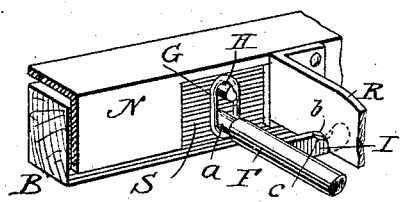
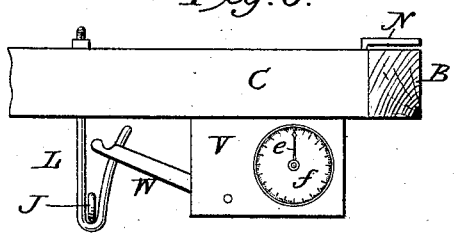
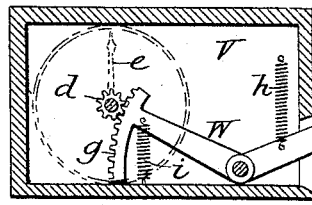

No. 774,008. Patented November 1, 1904.

UNITED STATES PATENT OFFICE.

WILLIAM M. WADE, OF RICHMOND, VIRGINIA, ASSIGNOR OF TWO-THIRDS TO THOMAS L. SPRATLEY, OF RICHMOND, VIRGINIA.

AUTOMATIC WEIGHING-TRUCK.

SPECIFICATION forming part of Letters Patent No. 774,008, dated November 1, 1904.

Application filed August 17, 1903. Serial No. 169,722. (No model.)

*To all whom it may concern:*

Be it known that I, WILLIAM M. WADE, a citizen of the United States, residing at Richmond, in the county of Henrico and State of Virginia, have invented certain new and useful Improvements in Automatic Weighing-Trucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to weighing-trucks, and has for its object to provide a truck with an automatic weighing scale or attachment which will be simple, strong, and durable in use and accurate in its weighing capacity and which can be attached to trucks of ordinary construction already in use by very slight additions to the truck.

To the accomplishment of the foregoing and such other objects as may hereinafter appear the invention consists in the features and in the combination of parts hereinafter particularly described and then sought to be clearly defined by the claims, reference being had to the accompanying drawings, forming a part hereof, and in which—

Figure 1 is a perspective of a truck having my invention applied thereto. Fig. 2 is a plan of the truck-frame with the skeleton frame removed. Fig. 3 is a perspective of the skeleton frame. Fig. 4 is a vertical longitudinal section through Fig. 1. Figs. 5, 6, and 7 are details.

In the drawings the letter A indicates a truck-frame, which may be of any well-known construction and comprising the shafts or rails B, cross-bar C, axle D, and wheels E. Within this truck-frame is suspended, at opposite ends thereof, the axles F, provided with journals $a$, which rest in links G, suspended from studs H, projecting from the shafts or rails of the truck-frame and having knife-edged bearings where the links hang from the same, and the lower edges of the journals $a$ where they rest in the links are likewise formed knife-edged. Each axle is formed with knife-edged lugs I, and one axle is provided with a lever J, which extends from the front axle to, under, and beyond the rear axle, and the other axle is provided with a lever J', which is suitably hinged or pivotally connected to the lever J, midway thereof, by means of a thumb-nut and bolt K or otherwise, and thus when one lever is raised or lowered the other lever will be correspondingly raised or lowered and both axles simultaneously turned so as to raise or lower their lugs, and when the lever J is lowered it rests in and is supported by the bracket L, extending from the cross-bar C. For the purpose of limiting the movement of the axles the rear axle may be connected by chains M or other means to the cross-bar C.

For attachment to the truck-frame I provide a skeleton frame consisting of side members N of angle form in cross-section and preferably of metal, which members extend parallel with the rails or shafts of the truck-frame and are adapted in normal position to have the horizontal portion rest upon the top of the truck-rails and the vertical portions or flanges to lie along the inside faces of said rails. The parallel members of this skeleton frame may be connected together by the cross-bars O and be provided at one end with the apron P and the wheel-guards Q. It is provided also with cross-bars R, which are adapted to rest upon the knife-edged lugs I, and at such points of contact they are made knife-edged and also preferably notched, as indicated at $b$, so as to guard against lateral sliding, and the knife-edges of the lugs I are also preferably notched at such points of contact, as indicated at $c$, so as to keep the bearing-points equidistant from the axis of the axles. These cross-bars R also serve to brace the skeleton frame. The vertical flanges of the longitudinal members of the frame are formed with recesses S, where the axles F are suspended, so as not to interfere with the bearings of the axles, and at other points they are formed with openings T, through which will extend studs U, projecting from the rails or shafts of the truck-frame, which studs will allow a longitudinal swinging movement to the skeleton frame when raised during the weighing operation and at the same time prevent displacement of such frame. The upper faces of the studs U are preferably made knife-edged, so as to fit into notches $c'$ made in the top walls of the openings T when the skeleton frame is lowered or at rest, so as to prevent sliding of the frame at such time.

From the cross-bar C or other suitable part of the truck-frame there is supported the weight-indicating mechanism, which may be of any suitable construction to indicate the weight of the freight or baggage on the truck when the lever J is connected therewith. As an indication of one means I illustrate a casing V, containing a pinion $d$, on the shaft of which is an index-finger $e$ in front of a dial $f$, the pinion $d$ having engaging therewith a toothed segment $g$ on the end of a pivoted or fulcrumed arm W, which extends through the casing V and in proximity to the end of the lever J, so that when the lever is rested thereon the arm W will be depressed and the pinion and its index-finger turned to indicate on the dial the weight of the load which is upon the skeleton frame, the arm W being under the influence of one or more springs $h\,i$.

In operation when the load on the truck is to be weighed the free end of the lever J is raised, which will turn the axles F and raise the lugs I so as to elevate the skeleton frame from resting upon the side rails of the truck-frame, and thus place the frame in a state of suspension, with the load resting thereon. With the frame in this state of suspension the free end of the lever J is brought into engagement with the weight-indicating mechanism—that is, in this particular instance the lever is caused to rest upon the arm W, which accordingly is depressed, so as to cause the index-finger to turn and indicate upon the dial the weight of the load. At other times than during the weighing operation the free end of the lever J is lowered and rests in the bracket L, and the side members of the skeleton frame rest firmly upon the rails or shafts of the truck-frame and serve at that time to afford a firm and steady support for the load and also protect the truck-frame against wear and tear incident to use.

It will be obvious from the foregoing that at comparatively small cost trucks already in use can be converted into automatic weighing-trucks and, further, that the several parts constituting the weighing attachment are comparatively few, and such parts as are made use of are simple and afford a strong and durable structure and such as will tend to materially increase the life and usefulness of a truck.

I have illustrated and described with particularity the preferred details of construction of the several parts, and while advantages result therefrom and protection is sought for the same yet changes can be made in such details and material features of my invention be employed.

Having described my invention and set forth its merits, what I claim is—

1. In a weighing-truck, the combination with the truck-frame having side rails and lugs extending from the inner sides of the side rails, of front and rear axles, each having laterally-extending lugs, links suspended from the lugs which extend from the side rails and supporting the opposite ends of said axles, means for turning said axles to raise their lugs, consisting of levers extending from the axles and connected together, and a skeleton frame having side members extending parallel with the side rails of the truck-frame and connected together by transverse bars located to rest upon the lugs of the axles and permit the frame to be supported above the side rails of the truck-frame when the axles are turned, substantially as described.

2. A weighing-truck comprising a truck-frame, front and rear axles provided each with lugs, levers extending from said axles and connected together for turning the axles and raising and lowering their extending lugs, studs extending from side rails of the truck-frame and provided with hanging links in which the journals of the front and rear axles rest, a frame having angle-shaped side members connected together and normally resting on the side rails of the truck-frame, the vertical flanges of said angle-shaped parallel members being formed with recesses, studs projecting from the side rails of the truck-frame and entering the recesses in the flanges of said angle-shaped members, cross-bars connecting the side members of the skeleton frame and adapted to rest on the lugs of the axles, and a weight-indicating mechanism with which one of the aforementioned levers may be connected and disconnected, substantially as described.

3. In a weighing-truck, the combination with the truck-frame having side rails, of a skeleton frame composed of angle-shaped side members adapted to fit to the side rails of the truck-frame and normally rest thereon, cross-bars connecting said angle-shaped side members, means carried by the truck-frame and adapted to contact with said cross-bars for raising the skeleton frame, levers coacting with said means and a weight-indicating means for weighing a load resting on the skeleton frame, and means for securing the skeleton frame in position, substantially as described.

In testimony whereof I affix my signature in presence of two witnesses.

WILLIAM M. WADE.

Witnesses:
FRANK D. EPPS,
L. B. STAINBACK.